US012057083B2

(12) United States Patent
Li et al.

(10) Patent No.: US 12,057,083 B2
(45) Date of Patent: Aug. 6, 2024

(54) DISPLAY DEVICE

(71) Applicant: WUHAN CHINA STAR OPTOELECTRONICS TECHNOLOGY CO., LTD., Hubei (CN)

(72) Inventors: Xiaochen Li, Hubei (CN); Gui Chen, Hubei (CN); Qiang Gong, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/292,507

(22) PCT Filed: Apr. 29, 2021

(86) PCT No.: PCT/CN2021/091017
§ 371 (c)(1),
(2) Date: May 10, 2021

(87) PCT Pub. No.: WO2022/217658
PCT Pub. Date: Oct. 20, 2022

(65) Prior Publication Data

US 2024/0021171 A1 Jan. 18, 2024

(30) Foreign Application Priority Data

Apr. 16, 2021 (CN) ......................... 202110412063.8

(51) Int. Cl.
*G09G 3/36* (2006.01)

(52) U.S. Cl.
CPC ... *G09G 3/3655* (2013.01); *G09G 2300/0426* (2013.01); *G09G 2310/08* (2013.01); *G09G 2320/0214* (2013.01)

(58) Field of Classification Search
CPC ... G09G 2320/02–0295; G09G 3/3655; G09G 2300/0426; G09G 2310/08; G09G 3/3266; G09G 3/3674; G09G 2300/0408; G09G 2300/0452; G09G 2300/0465; G09G 2300/0819; G09G 2300/0842;
(Continued)

(56) References Cited

U.S. PATENT DOCUMENTS

2010/0265235 A1* 10/2010 Lee ...................... G09G 3/3655 345/87
2012/0098816 A1* 4/2012 Lee ...................... G09G 3/3655 345/212
2015/0062471 A1* 3/2015 Sung ..................... G02F 1/1362 349/33

FOREIGN PATENT DOCUMENTS

CN 1591103 A 3/2005
CN 101266369 A 9/2008
(Continued)

*Primary Examiner* — Amr A Awad
*Assistant Examiner* — Aaron Midkiff

(57) ABSTRACT

A display device is disclosed. The display device includes a control module and a display panel connected to the control module. Wherein, the display panel includes a plurality of pixel electrodes; a plurality of first common electrodes disposed opposite to the pixel electrodes and connected to the control module by common connecting lines; and a liquid crystal layer disposed between the first common electrodes and the pixel electrodes. Wherein, the control module is configured to allow a constant electrical potential difference to exist between the first common electrodes and the pixel electrodes.

7 Claims, 3 Drawing Sheets

(58) Field of Classification Search
CPC ... G09G 2310/0251; G09G 2310/0262; G09G 2320/045; G09G 2300/0804; G09G 2310/0297; G09G 2300/04; G09G 2300/0421; G09G 3/36; G09G 3/3648; H10K 59/12; H10K 59/123; H10K 59/126; H10K 59/131; G02F 1/1362; G02F 1/136286; G02F 1/1343
See application file for complete search history.

(56) References Cited

FOREIGN PATENT DOCUMENTS

| | | | |
|---|---|---|---|
| CN | 101847376 | A | 9/2010 |
| CN | 102023423 | A | 4/2011 |
| CN | 102610205 | A | 7/2012 |
| CN | 104061138 | A | 9/2014 |
| CN | 104064138 | A | 9/2014 |
| CN | 104423104 | A | 3/2015 |
| CN | 104932165 | A | 9/2015 |
| CN | 106773412 | A | 5/2017 |
| CN | 111739923 | A | 10/2020 |

* cited by examiner

DISPLAY DEVICE

FIELD OF INVENTION

The present disclosure relates to the field of display technologies, and more particularly, to a display device.

BACKGROUND OF INVENTION

Liquid crystal displays (LCDs) form liquid crystal rotation voltages by an electrical potential difference between pixel electrodes and common electrodes (COM), thereby controlling polarization states of polarized light. Wherein, the polarized light having different polarization states will display different grayscale brightness after filtering by polarizers. The pixel electrodes are usually controlled to be turned on or turned off by thin film transistor (TFT) switches. When the TFT switches are turned on, the pixel electrodes are charged, and after finishing charging, the TFT switches are turned off to allow the pixel electrodes to maintain a predetermined voltage. At a same time, the common electrodes are directly connected to an integrated circuit (IC), and a voltage of the common electrodes is maintained to be stable and unchanged by constant output of the IC, so that required liquid crystal rotation voltages are formed between the pixel electrodes and the common electrodes to achieve an objective of displaying different grayscale brightness.

FIG. 1 is a schematic change diagram of electrical potentials of the pixel electrodes and the common electrodes in current technology.

However, as shown in FIG. 1, due to characteristics of semiconductor TFT switches, the TFT switches cannot completely be turned off and a predetermined leakage current will exist, which causes electrical potentials (V pixel electrode) of the pixel electrodes to change after finishing charging due to electrical leakage. Meanwhile, since the common electrodes are always provided with constant voltage output by the IC, electrical potentials (V common electrode) of the common electrodes remain unchanged, so that the liquid crystal rotation voltages will change, and grayscale pictures specified by the IC cannot be displayed. In addition to normal-frequency products, at present, low-frequency displays are receiving more and more attentions and demands from people. For such products, an impact of electrical leakage will be particularly serious.

Technical problem: an objective of the present disclosure is to provide a display device to solve a technical problem of poor display effect caused by changes of the liquid crystal rotation voltages due to electrical leakage of the pixel electrodes.

SUMMARY OF INVENTION

To realize the above objective, the present disclosure provides a display device, which includes: a control module; and a display panel connected to the control module; Wherein, the display panel includes a plurality of pixel electrodes; a plurality of first common electrodes disposed opposite to the pixel electrodes and connected to the control module by common connecting lines; and a liquid crystal layer disposed between the first common electrodes and the pixel electrodes; wherein, the control module is configured to output a control signal to the display panel to allow a constant electrical potential difference to exist between the first common electrodes and the pixel electrodes.

Further, when the control module outputs an alternating current (AC) low-level signal to the display panel, an electrical potential of the first common electrodes and an electrical potential of the pixel electrodes are both 0 V.

Further, when there is no signal input to the display panel, the first common electrodes and the pixel electrodes are both in a floating state.

Further, the control module is a driving integrated circuit (driving IC).

Further, the control module includes: a plurality of second common electrodes; and a plurality of signal switch transistors, an input terminal of each of the signal switch transistors is connected to each of the second common electrodes by one of the common connecting lines, an output terminal of each of the signal switch transistors is connected to each of the first common electrodes, and a control terminal of each of the signal switch transistors is connected to a driving integrated circuit (driving IC).

Further, the signal switch transistors are configured to control whether a direct current (DC) low-voltage signal is input to the display panel.

Further, when the driving IC outputs the DC low-voltage signal to the display panel and the control terminal of each of the signal switch transistors is turned on, the driving IC outputs the DC low-voltage signal to the signal switch transistors by the second common electrodes, the control terminal of each of the signal switch transistors outputs the DC low-voltage signal to the signal switch transistors, and the signal switch transistors output the DC low-voltage signal to the first common electrodes; and an electrical potential of the first common electrodes is same as an electrical potential of the second common electrodes, and there is a constant electrical potential difference between the first common electrodes and the pixel electrodes.

Further, when the driving IC outputs the DC low-voltage signal to the display panel and the control terminal of each of the signal switch transistors is turned off, the driving IC outputs the DC low-voltage signal to the signal switch transistors by the second common electrodes, the signal switch transistors do not output any signal, an electrical potential of the first common electrodes is different from an electrical potential of the second common electrodes, and the first common electrodes and the pixel electrodes are both in a floating state.

Further, when the driving IC outputs the DC low-voltage signal to the display panel and the control terminal of a part of the signal switch transistors is turned on and the control terminal of another part of the signal switch transistors is turned off, there is a constant electrical potential difference between the first common electrodes connected to the control terminal of the part of the signal switch transistors that is turned on and corresponding pixel electrodes; and the first common electrodes connected to the control terminal of the another part of the signal switch transistors that is turned off and another corresponding pixel electrodes are both in a floating state.

Further, when there is no signal input to the display panel, electrical potentials of the first common electrodes and the pixel electrodes are both in a floating state.

Beneficial effect: technical effects of the present disclosure are that the display device provided by the present disclosure uses the control module (the driving IC) or adds the signal switch transistors in the control module to control output of signals, thereby allowing turned-on and turned-off states of driving switch transistors to be same as that of the signal switch transistors. Therefore, a rotation voltage of the liquid crystal layer between the pixel electrodes and the first common electrodes can remain unchanged, a holding ability of pixels can be improved, and electrical leakage of the pixel electrodes can be relieved.

DESCRIPTION OF DRAWINGS

The accompanying figures to be used in the description of embodiments of the present disclosure will be described in brief to more clearly illustrate the technical solutions of the embodiments. The accompanying figures described below are only a part of the embodiments of the present disclosure, from which those skilled in the art can derive further figures without making any inventive efforts.

Figure 1:
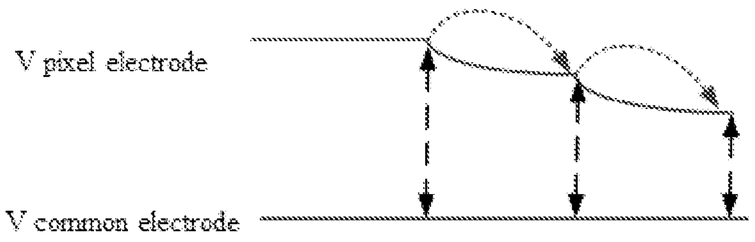
FIG. 1 is a schematic change diagram of electrical potentials of pixel electrodes and common electrodes in current technology.

Elements in the drawings are designated by reference numerals listed below.

100*a*, 100*b*: display device; 10: display panel;
20: control module; 30: common connecting lines;
101: array substrate; 102: pixel electrodes;
103: liquid crystal layer; 104: first common electrodes;
201: second common electrodes; 202: driving integrated circuit (driving IC).

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. The terms "first", "second", etc. (if present) in the specification, claims of the present disclosure, and the drawings are used to distinguish similar objects, and are not necessarily used to describe in a particular order or prioritization. it should be understood that the objects so described may be interchanged where appropriate. In addition, the term "include", "have", and their variations are intended to cover a non-exclusive inclusion.

Embodiment 1

Figure 2:
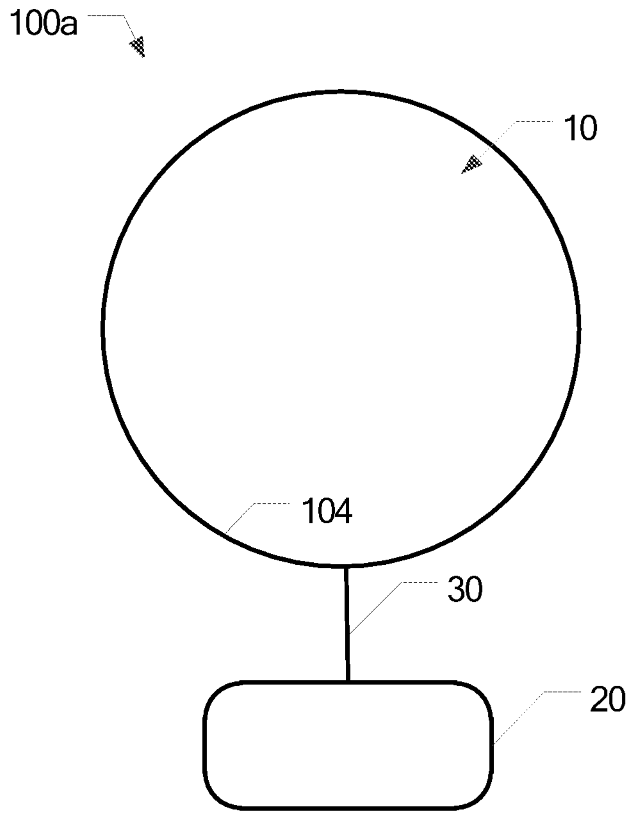
FIG. 2 is a schematic structural diagram of a display device according to embodiment 1 of the present disclosure.
Figure 3:
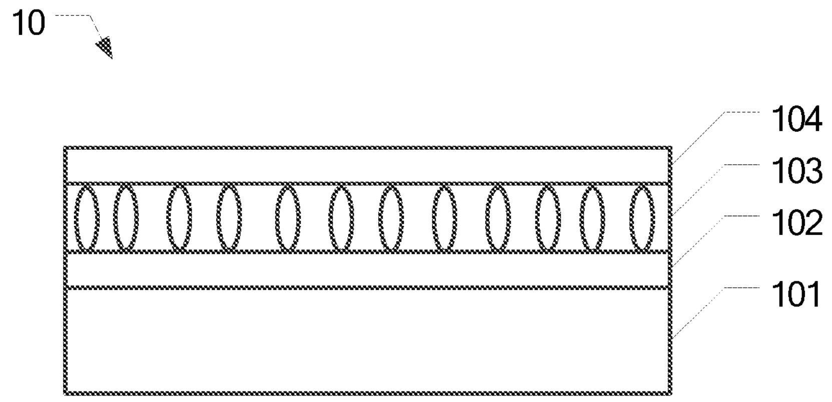
FIG. 3 is a schematic structural diagram of a display panel according to embodiment 1 of the present disclosure.

FIG. 2 is a schematic structural diagram of a display device according to this embodiment of the present disclosure, and FIG. 3 is a schematic structural diagram of a display panel according to this embodiment of the present disclosure.

As shown in FIGS. 2 and 3, this embodiment provides the display device 100*a*, which includes the display panel 10 and a control module 20. The control module 20 is electrically connected to the display panel 10 by common connecting lines 30.

The display panel 10 includes an array substrate 101, a plurality of pixel electrodes 102, a liquid crystal layer 103, and a plurality of first common electrodes 104. The array substrate 101 includes a plurality of driving switch transistors TFT1 (not shown in the figure), the pixel electrodes 102 are disposed on the array substrate 101, the first common electrodes 104 are disposed opposite to the pixel electrodes 102, and the liquid crystal layer 103 is disposed between the pixel electrodes 102 and the first common electrodes 104.

In this embodiment, the driving switch transistors TFT1 are configured to control the pixel electrodes 102 to be turned on or turned off, and the first common electrodes 104 are connected to the control module 20 by the common connecting lines 30. When the driving switch transistors TFT1 are turned on, the pixel electrodes 102 are charged, and when the driving switch transistors TFT1 are turned off, the pixel electrodes 102 hold a predetermined voltage, and at a same time, the first common electrodes 104 are directly connected to the control module 20, and the control module 20 directly controls whether to output a signal to the first common electrodes 104. The control module 20 is configured to output a control signal to the display panel 10 to allow an electrical potential of the pixel electrodes 102 and an electrical potential of the first common electrodes 104 to have a same changing trend, thereby ensuring the pixel electrodes 102 and the first common electrodes 104 to have a constant electrical potential difference. Therefore, a rotation voltage of the liquid crystal layer 103 between the pixel electrodes 102 and the first common electrodes 104 can remain unchanged, thereby improving a holding ability of pixels and relieving electrical leakage of the pixel electrodes 102. Display quality and reliability of the display device can be improved while maintaining normal display, thereby improving product competitiveness.

In this embodiment, the control module 20 is a driving integrated circuit (driving IC) and is configured to control signal transmission to the first common electrodes 104 or not. When the control module 20 outputs an alternating current (AC) low-level signal to the display panel 10, the electrical potential of the first common electrodes 104 and the electrical potential of the pixel electrodes 102 are both 0 V. When there is no signal input to the display panel 10, the first common electrodes 104 and the pixel electrodes 102 are both in a floating state.

In this embodiment, the control module 20 can also allow the display panel 10 to realize entire screen control or partition control by a transmission way of the control signal. In other word, the control module 20 can control images of entire screen to be grayscale images or control an image in a certain area to be a grayscale image by transmitting signals.

The display device 100*a* provided by this embodiment can be applied to all add-on display products.

Embodiment 2

This embodiment of the present disclosure provides the display device, which includes most technical features of embodiment 1. A difference is that the control module further includes a plurality of second common electrodes and a plurality of signal switch transistors.

Figure 4:
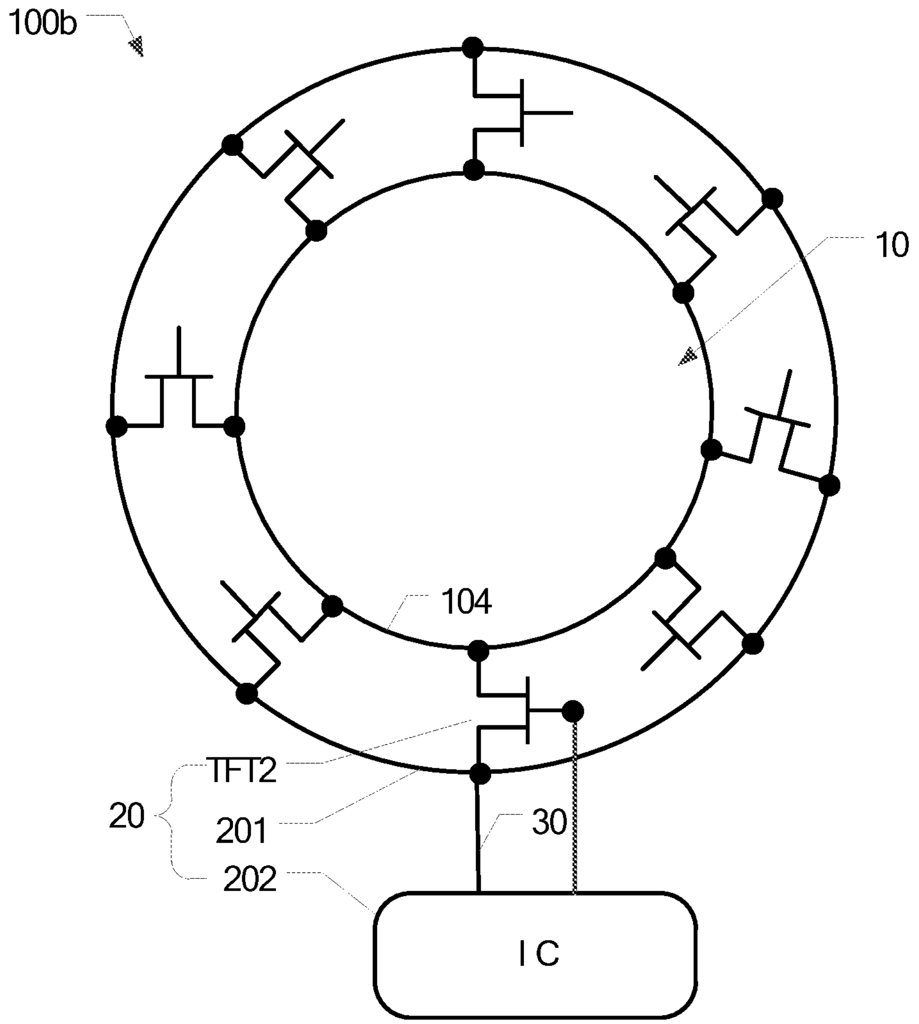
FIG. 4 is a schematic structural diagram of the display device according to embodiment 2 of the present disclosure.

FIG. 4 is a schematic structural diagram of the display device according to this embodiment of the present disclosure. Specifically, as shown in FIG. 4, this embodiment provides the display device 100*b*, which includes the display panel 10 and the control module 20. The control module 20 is electrically connected to the display panel 10 by the common connecting lines 30.

The control module 20 includes the second common electrodes 201, the signal switch transistors TFT2, and the driving IC 202. An input terminal of each of the signal switch transistors TFT2 is connected to each of the second common electrodes 201 by one of the common connecting lines 30, an output terminal of each of the signal switch transistors TFT2 is connected to each of the first common electrodes 104, and a control terminal of each of the signal switch transistors TFT2 is connected to the driving IC 202.

In this embodiment, the driving switch transistors TFT1 are configured to control the pixel electrodes 102 to be turned on or turned off, and the signal switch transistors TFT2 are configured to control whether a direct current (DC) low-voltage signal is input to the display panel 10. When the driving switch transistors TFT1 are turned on, the pixel electrodes 102 are charged, and when the driving switch transistors TFT1 are turned off, the pixel electrodes 102 hold the predetermined voltage, and at a same time, the second common electrodes 201 receive a signal from the driving IC 202, and the signal switch transistors TFT2 control whether this signal is to be input to the first common electrodes 104 or not, thereby allowing the electrical potential of the pixel electrodes 102 and the electrical potential of the first common electrodes 104 to have the same changing trend, thereby ensuring the pixel electrodes 102 and the first common electrodes 104 to have the constant electrical potential difference. Therefore, the rotation voltage of the liquid crystal layer 103 between the pixel electrodes 102 and the first common electrodes 104 can remain unchanged, thereby improving the holding ability of pixels. Display quality and reliability of the display device can be improved while maintaining normal display, thereby improving the product competitiveness.

In this embodiment, when the driving IC 202 outputs the DC low-voltage signal to the display panel 10 and the control terminal of each of the signal switch transistors TFT2 is turned on, the driving IC 202 outputs the DC low-voltage signal to the input terminal of each of the signal switch transistors TFT2 by the second common electrodes 201, the control terminal of each of the signal switch transistors TFT2 outputs the DC low-voltage signal from the input terminal of each of the signal switch transistors TFT2 to the output terminal of each of the signal switch transistors TFT2, and the output terminal of each of the signal switch transistors TFT2 outputs the DC low-voltage signal to the first common electrodes 104. The electrical potential of the first common electrodes 104 is same as an electrical potential of the second common electrodes 201, and there is a constant electrical potential difference between the first common electrodes 104 and the pixel electrodes 102. Therefore, the rotation voltage of the liquid crystal layer 103 between the pixel electrodes 102 and the first common electrodes 104 can remain unchanged, and the holding ability of the pixels can be improved, thereby relieving electrical leakage of the pixel electrodes 102.

When the driving IC 202 outputs the DC low-voltage signal to the display panel 10 and the control terminal of each of the signal switch transistors TFT2 is turned off, the driving IC 202 outputs the DC low-voltage signal to the input terminal of each of the signal switch transistors TFT2 by the second common electrodes 201, and the control terminal of each of the signal switch transistors TFT2 cannot output the DC low-voltage signal from the input terminal of each of the signal switch transistors TFT2 to the output terminal of each of the signal switch transistors TFT2. Therefore, the electrical potential of the first common electrodes 104 is different from the electrical potential of the second common electrodes 201, and the first common electrodes and the pixel electrodes are both in the floating state.

When the driving IC 202 outputs the DC low-voltage signal to the display panel 10 and the control terminal of a part of the signal switch transistors TFT2 is turned on and the control terminal of another part of the signal switch transistors TFT2 is turned off, there is the constant electrical potential difference between the first common electrodes 104 connected to the control terminal of the part of the signal switch transistors TFT2 that is turned on and the pixel electrodes 102 corresponding thereto, and the first common electrodes 104 connected to the control terminal of the another part of the signal switch transistors TFT2 that is turned off and the pixel electrodes 102 corresponding thereto are both in the floating state. Simply put, the driving IC 202 controls a part of the signal switch transistors TFT2 to be turned on and another part of the signal switch transistors TFT2 to be turned off, so that the display panel 10 can realize partition control by signals. When the driving IC 202 controls all signal switch transistors TFT2 to be turned on, the display panel 10 realizes entire screen control by the signals.

When there is no signal input to the display panel 10, the first common electrodes 104 and the pixel electrodes 102 are both in the floating state.

Figure 5:
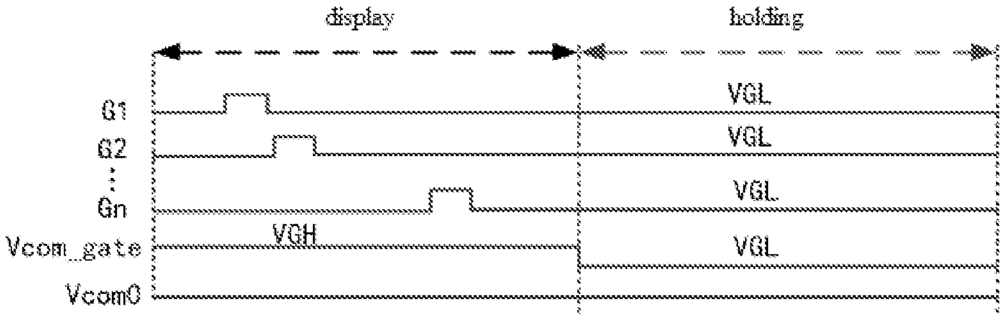
FIG. 5 is a timing diagram of the display device according to embodiment 2 of the present disclosure.

FIG. 5 is a timing diagram of the display device according to this embodiment of the present disclosure. As shown in FIG. 5, G1 to Gn are electrical potentials of the driving switch transistors, Vcom_gate is an electrical potential of the signal switch transistors, and Vcom0 is an electrical potential of the first common electrodes. From this figure, it can be seen that when the signal switch transistors are always at a high electrical potential and any one of the driving switch transistors G1 to Gn is at the high electrical potential, the signal switch transistors are turned on, the one of the driving switch transistors G1 to Gn is turned on, the driving IC outputs the DC low-voltage signal to the display panel, the control terminal of this signal switch transistor outputs the DC low-voltage signal from the input terminal of this signal switch transistor to the output terminal thereof, and the output terminal of this signal switch transistor outputs the DC low-voltage signal to the first common electrodes. That is, the electrical potential of the first common electrodes is always at a low electrical potential, thereby allowing the constant electrical potential difference to exist between the first common electrodes and the pixel electrodes.

Therefore, by disposing the signal switch transistors between the driving IC and the first common electrodes, turned-on and turned-off states of the driving switch transistors can be allowed to be same as that of the signal switch transistors. Therefore, the rotation voltage of the liquid crystal layer between the pixel electrodes and the first common electrodes can remain unchanged, and the holding ability of the pixels can be improved, thereby relieving electrical leakage of the pixel electrodes.

The display device provided by this embodiment can be applied to all add-on display products. Of course, the display device can also be applied to in-cell touch control products. When the display device is applied to the in-cell touch control products, the second common electrodes are emitting electrodes Tx, the driving IC can output the signals to the emitting electrodes Tx and provide a required electrical potential to the display panel by the signal switch transistors, thereby allowing the electrical potential of the pixel electrodes and the electrical potential of the first common electrodes to have the same changing trend, thereby ensuring the pixel electrodes and the first common electrodes to have the constant electrical potential difference. Therefore, the rotation voltage of the liquid crystal layer between the pixel electrodes and the first common electrodes can remain unchanged, thereby improving the holding ability of pixels.

In particular to refresh rate products, they not only can have a lower refresh rate but also can reduce power consumption while maintaining normal display, thereby improving a battery life and competitiveness of the products.

The display device provided by the embodiments of the present disclosure are described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A display device, comprising:

a control module; and a display panel connected to the control module;

wherein the display panel comprises: a plurality of pixel electrodes;

a plurality of first common electrodes disposed opposite to the pixel electrodes and connected to the control module by common connecting lines; and a liquid crystal layer disposed between the first common electrodes and the pixel electrodes;

wherein the control module is configured to output a control signal to the display panel to allow a constant electrical potential difference to exist between the first common electrodes and the pixel electrodes;

wherein the control module comprises:

a plurality of second common electrodes; and a plurality of signal switch transistors, wherein an input terminal of each of the signal switch transistors is connected to each of the second common electrodes by one of the common connecting lines, an output terminal of each of the signal switch transistors is connected to each of the first common electrodes, and a control terminal of each of the signal switch transistors is connected to a driving integrated circuit (driving IC);

wherein the signal switch transistors are configured to control whether a direct current (DC) low-voltage signal is input to the display panel;

wherein when the driving IC outputs the DC low-voltage signal to the display panel and the control terminal of each of the signal switch transistors is turned on, the driving IC outputs the DC low-voltage signal to the signal switch transistors by the second common electrodes, the control terminal of each of the signal switch transistors outputs the DC low-voltage signal to the signal switch transistors, and the signal switch transistors output the DC low-voltage signal to the first common electrodes; and wherein an electrical potential of the first common electrodes is same as an electrical potential of the second common electrodes, and the constant electrical potential difference exists between the first common electrodes and the pixel electrodes.

2. The display device according to claim 1, wherein when the control module outputs an alternating current (AC) low-level signal to the display panel, an electrical potential of the first common electrodes and an electrical potential of the pixel electrodes are both 0 V.

3. The display device according to claim 1, wherein when there is no signal input to the display panel, the first common electrodes and the pixel electrodes are both in a floating state.

4. The display device according to claim 1, wherein the control module is a driving integrated circuit (driving IC).

5. The display device according to claim 1, wherein when the driving IC outputs the DC low-voltage signal to the display panel and the control terminal of each of the signal switch transistors is turned off, the driving IC outputs the DC low-voltage signal to the signal switch transistors by the second common electrodes, the signal switch transistors do not output any signal, an electrical potential of the first common electrodes is different from an electrical potential of the second common electrodes, and the first common electrodes and the pixel electrodes are both in a floating state.

6. The display device according to claim 1, wherein when the driving IC outputs the DC low-voltage signal to the display panel and the control terminal of a part of the signal switch transistors is turned on and the control terminal of another part of the signal switch transistors is turned off, the constant electrical potential difference exists between the first common electrodes connected to the control terminal of the part of the signal switch transistors that is turned on and corresponding pixel electrodes; and the first common electrodes connected to the control terminal of the another part of the signal switch transistors that is turned off and another corresponding pixel electrodes are both in a floating state.

7. The display device according to claim 1, wherein when there is no signal input to the display panel, electrical potentials of the first common electrodes and the pixel electrodes are both in a floating state.

* * * * *